(12) United States Patent
Ahn et al.

(10) Patent No.: US 10,889,733 B2
(45) Date of Patent: Jan. 12, 2021

(54) COATING COMPOSITION FOR FORMING SCRATCH-RESISTANT LAYER HAVING HIGH STRENGTH FOR AUTOMOBILE EXTERIOR AND METHOD FOR COATING AUTOMOBILE EXTERIOR USING THE SAME

(71) Applicant: NOROO BEE Chemical Co., Ltd., Cheonan-Si (KR)

(72) Inventors: Jae Beom Ahn, Anyang-si (KR); Young Hoon Choi, Cheonan-si (KR); Dae Geun Oh, Cheonan-si (KR); Sung Do Kim, Cheonan-si (KR); Si Hyun Jeong, Asan-si (KR)

(73) Assignee: NOROO BEE Chemical Co., Ltd., Cheonan-Si (KR)

( * ) Notice: Subject to any disclaimer, the term of this patent is extended or adjusted under 35 U.S.C. 154(b) by 49 days.

(21) Appl. No.: 16/204,025

(22) Filed: Nov. 29, 2018

(65) Prior Publication Data
US 2019/0177569 A1 Jun. 13, 2019

(30) Foreign Application Priority Data
Dec. 12, 2017 (KR) .................. 10-2017-0170743

(51) Int. Cl.
| | | |
|---|---|---|
| *C09D 133/14* | (2006.01) | |
| *C08G 18/62* | (2006.01) | |
| *C09D 133/10* | (2006.01) | |
| *C09D 7/63* | (2018.01) | |
| *C09D 5/00* | (2006.01) | |
| *C09D 133/06* | (2006.01) | |
| *C08G 18/40* | (2006.01) | |
| *C09D 175/06* | (2006.01) | |
| *C08L 33/08* | (2006.01) | |
| *C08L 67/04* | (2006.01) | |
| *C08K 5/29* | (2006.01) | |
| *C08G 63/91* | (2006.01) | |

(52) U.S. Cl.
CPC ....... *C09D 133/10* (2013.01); *C08G 18/4063* (2013.01); *C08G 18/6229* (2013.01); *C08G 18/6233* (2013.01); *C09D 5/00* (2013.01); *C09D 7/63* (2018.01); *C09D 133/066* (2013.01); *C09D 175/06* (2013.01); *C08G 63/912* (2013.01); *C08K 5/29* (2013.01); *C08L 33/08* (2013.01); *C08L 67/04* (2013.01)

(58) Field of Classification Search
None
See application file for complete search history.

(56) References Cited

FOREIGN PATENT DOCUMENTS

| JP | 2000-293895 A | 10/2000 |
| KR | 10-0643335 B1 | 11/2006 |
| WO | WO-2015/037280 | * 3/2015 |

* cited by examiner

*Primary Examiner* — David J Buttner
(74) *Attorney, Agent, or Firm* — Daly Crowley Mofford & Durkee, LLP

(57) ABSTRACT

A coating composition may include 5 wt % to 20 wt % of a caprolactone-modified hyperbranched polyester polyol, the caprolactone-modified hyperbranched polyester polyol obtained from polyhydric alcohol including caprolactone triol, 30 wt % to 50 wt % of a first acrylic resin, the first acrylic resin having a hydroxyl group, 15 wt % to 25 wt % of a second acrylic resin, the second acrylic resin having a hydroxyl group and having a glass transition temperature higher than that of the first acrylic resin, and an extra solvent.

12 Claims, No Drawings

COATING COMPOSITION FOR FORMING SCRATCH-RESISTANT LAYER HAVING HIGH STRENGTH FOR AUTOMOBILE EXTERIOR AND METHOD FOR COATING AUTOMOBILE EXTERIOR USING THE SAME

CROSS-REFERENCE TO RELATED APPLICATION

This application claims priority under 35 USC § 119 to Korean Patent Application No. 10-2017-0170743, filed on Dec. 12, 2017 in the Korean Intellectual Property Office (KIPO), the contents of which are herein incorporated by reference in their entirety.

BACKGROUND

1. Field

Example embodiments relate to a coating composition. More particularly, example embodiments relate to a scratch-resistant coating composition used as a clear paint in an exterior coating process of an automobile and a method for coating automobile exterior using the same.

2. Description of the Related Art

In recent years, demand for high glossy coating has increased in the automobile industry. Particularly, in the case of high-end automobile, it is necessary to realize high glossy coating for black color. However, in the case of high glossy coating, fine scratches are increased on a clear coating surface as time elapses, and thus there is a problem that the gloss and transparency are reduced and the haze of surface is increased.

As the paint for the clear coating, a urethane clear paint is known. However, although the urethane clear paint is excellent in its own strength, it is composed of resins having a high glass transition temperature, and thus has a problem of poor scratch resistance.

Japanese Unexamined Patent Application Publication No. 2000-293895 discloses a technique of using silica to increase the strength of a coating layer and to prevent scratches. However, there is a problem in that impact resistance and flexibility are lowered when applied to soft part.

In Korean Patent No. 10-0643335, although an acrylic resin, an aliphatic polyester region and a isocyanate curing agent are reacted to have a dense urethane molecule structure and a ladder structure in the molecule to improve the performance of self-restoration as time elapses, this is a low-temperature curing type paint applied to automobile interior parts and some plastic parts, and cannot describe the reliability as an exterior for automobile.

SUMMARY

The present invention in accordance with example embodiments provides a coating composition capable of forming a coating layer having a great scratch-restorability and a high strength to solve the above-mentioned problems.

The present invention in accordance with other embodiments provides a method for coating automobile exterior using the coating composition.

According to example embodiments, there is provided a coating composition. The coating composition device includes 5 wt % to 20 wt % of a caprolactone-modified hyperbranched polyester polyol, the caprolactone-modified hyperbranched polyester polyol obtained from polyhydric alcohol including caprolactone triol, 30 wt % to 50 wt % of a first acrylic resin, the first acrylic resin having a hydroxyl group, 15 wt % to 25 wt % of a second acrylic resin, the second acrylic resin having a hydroxyl group and having a glass transition temperature higher than that of the first acrylic resin, and an extra solvent.

In one embodiment, the caprolactone-modified hyperbranched polyester polyol has an acid value of 10 mg/KOH or less, a hydroxyl group content of 6% to 8%, and a weight average molecular weight of 1,000 to 2,000.

In one embodiment, the caprolactone-modified hyperbranched polyester polyol is obtained by reacting a polybasic acid or a derivative thereof, a diol compound and the caprolactone triol.

In one embodiment, the polybasic acid or a derivative thereof includes at least one selected from the group consisting of terephthalic acid, phthalic acid, phthalic anhydride, dimethylterephthalic acid, naphthalene dicarboxylate, tetrachlorophthalic acid, terephthalic acid bisglycol ester, isophthalic acid, t-butyl isophthalic acid, fumaric acid, adipic acid, azelaic acid, sebacic acid, dodecanoic acid, glutaric acid, succinic acid, oxalic acid, itaconic acid, dimeric fatty acid, maleic anhydride, succinic acid anhydride, chlorendic acid, diglycolic acid, pimelic acid, suberic acid, 1,4-cyclohexanedicarboxylic acid, 1,3-cyclohexanedicarboxylic acid, hexahydrophthalic anhydride and dimethyl cyclohexanedicarboxylate.

In one embodiment, the diol compound includes at least one selected from the group consisting of 1,6-hexanediol, 2-butyl-2-ethyl-1,3-propanediol, 1,4-cyclohexanedimethanol, diethylene glycol, 1,3-propanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, 3-methyl-1,5-pentanediol, methylpropanediol, 2-methyl-1,3-propanediol, dipropylene glycol, 1,9-nonanediol and glycerol.

In one embodiment, the first acrylic resin has a solid content of 60% to 70%, a weight average molecular weight of 5,000 to 12,000, a hydroxyl group content of 4% to 6%, and a glass transition temperature of 10° C. to 20° C.

In one embodiment, the first acrylic resin is obtained by a radical polymerization of a monomer mixture including aliphatic methacrylate of 20 wt % to 50 wt %, methacrylate having a hydroxyl group of 20 wt % to 50 wt %, (meth)acrylic acid of 0.1 wt % to 3 wt %, aliphatic acrylate of 5 wt % to 20 wt %, caprolactone-modified (meth)acrylate of 10 wt % to 20 wt % and aromatic acrylate of 10 wt % to 20 wt %.

In one embodiment, the second acrylic resin has a solid content of 55% to 65%, a weight average molecular weight of 8,000 to 20,000, a hydroxyl group content of 3% to 5%, and a glass transition temperature of 40° C. to 50° C.

In one embodiment, the second acrylic resin is obtained by a radical polymerization of a monomer mixture including aliphatic methacrylate of 20 wt % to 50 wt %, methacrylate having a hydroxyl group of 20 wt % to 40 wt %, (meth)acrylic acid of 0.1 wt % to 3 wt %, aliphatic acrylate of 5 wt % to 20 wt % and aromatic acrylate of 10 wt % to 25 wt %.

In one embodiment, the solvent includes an alcohol-based solvent.

In one embodiment, the coating composition further includes at least one selected from the group consisting of a wetting agent, a light stabilizer and a reaction catalyst.

According to example embodiments, there is provided a method for coating automobile exterior. The method includes pretreating a surface of an object to be coated, forming a base coating layer on the surface of the object to be coated, forming a color layer on the base coating layer, coating a mixture of the coating composition selected from any one of claims 1 to 11 and a curing agent on the color layer, and heat-treating the coated mixture to form a cured coating layer.

In one embodiment, the curing agent includes a hexamethylene diisocyanate trimer.

A coating composition in accordance with example embodiments may form a coating layer having scratch-resistance and high strength. When the coating composition is applied to an exterior coating process of an automobile, it is possible to restore itself to scratches caused by washing, external environment, etc., and to form an exterior coating layer having excellent in water resistance, impact resistance, acid resistance, heat resistance and strength.

DESCRIPTION OF EMBODIMENTS

The present invention may make various changes and may take various forms, and specific embodiments may be described in detail. However, it is to be understood that the present invention is not limited to the specific embodiments, but covers all modifications, equivalents and alternatives included in the spirit and scope of the present invention.

The terms first, second, etc. may be used to describe various elements, but the elements should not be limited by the terms. The terms are used only for the purpose of distinguishing one element from another. For example, without departing from the scope of the present invention, a first element may be referred to as a second component, and similarly, a second component may also be referred to as a first component.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Coating Composition for Forming Scratch-Resistant Layer Having High Strength for Automobile Exterior A coating composition in accordance with one embodiment of the present invention may include (a) a caprolactone-modified hyperbranched polyester polyol, (b) a first acrylic resin, (c) a second acrylic resin and (d) a solvent. The coating composition may further include (e) additives, e.g., wetting agent, light stabilizer, etc. Also, the coating composition may further include (f) a curing agent, or may be used in combination with it.

(a) Caprolactone-Modified Hyperbranched Polyester Polyol

The caprolactone-modified hyperbranched polyester polyol may have a hyperbranched structure formed by the reaction of a caprolactone polyol and a polybasic acid.

For example, the caprolactone-modified hyperbranched polyester polyol may be obtained by reacting a polybasic acid or a derivative thereof, a diol compound and the caprolactone polyol.

The diol compound may include, e.g., neopentyl glycol, 1,6-hexanediol, 2-butyl-2-ethyl-1,3-propanediol, 1,4-cyclohexanedimethanol, diethylene glycol, 1,3-propanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, 3-methyl-1,5-pentanediol, methylpropanediol, 2-methyl-1,3-propanediol, dipropylene glycol, 1,9-nonanediol, glycerol, etc. These may be used alone or in combinations of two or more. In one embodiment, the diol compound may include neopentyl glycol.

The caprolactone polyol may include caprolactone triol. Caprolactone triol may impart elasticity to the coating layer and improve the restorability against scratches. Since caprolactone triol has a lower molecular weight and a higher hydroxyl group content than other polyols, the cross-linked density and the content of network structure may be increased. Accordingly, the elasticity of the coating layer may be enhanced.

For example, the chemical structural formula of the caprolactone triol may be represented by the following Formula 1.

<Formula 1>

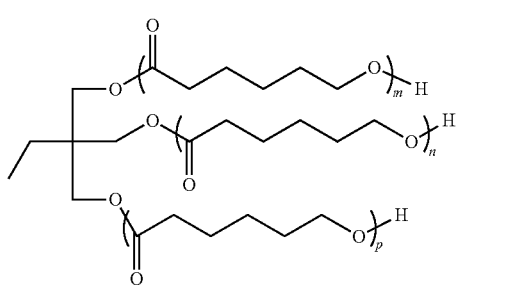

(In Formula 1, each of m, n, p is a natural number, and may have a corresponding value depending on the molecular weight.)

For example, the polybasic acid or the derivative thereof may include an aromatic divalent acid/acid derivative, an aliphatic divalent acid/acid derivative or an alicyclic divalent acid/acid derivative.

The aromatic divalent acid/acid derivative may include, e.g., terephthalic acid, phthalic acid, phthalic anhydride, dimethylterephthalic acid, naphthalene dicarboxylate, tetrachlorophthalic acid, terephthalic acid bisglycol ester, isophthalic acid, t-butyl isophthalic acid, etc. The aliphatic divalent acid/acid derivative may include. e.g., fumaric acid, adipic acid, azelaic acid, sebacic acid, dodecanoic acid, glutaric acid, succinic acid, oxalic acid, itaconic acid, dimeric fatty acid, maleic anhydride, succinic acid anhydride, chlorendic acid, diglycolic acid, pimelic acid, suberic acid, etc. The alicyclic divalent acid/acid derivative may include, e.g., 1,4-cyclohexanedicarboxylic acid, 1,3-cyclohexanedicarboxylic acid, hexahydrophthalic anhydride, dimethyl cyclohexanedicarboxylate, etc. These may be used alone or in combinations of two or more.

In one embodiment, the polybasic acid or the derivative thereof may include the alicyclic divalent acid/acid derivative. The polybasic acid or the derivative thereof may include, e.g., dimethyl cyclohexanedicarboxylate.

In one embodiment, the polybasic acid or the derivative thereof may include the aliphatic divalent acid/acid derivative.

Preferably, the alicyclic divalent acid/acid derivative may participate in a first reaction (exchange reaction), and the aliphatic divalent acid/acid derivative may participate in a second reaction (symmetric reaction). When the alicyclic divalent acid/acid derivative and the aliphatic divalent acid/acid derivative participate in the same reaction, it is difficult to obtain a polyol having a symmetrical structure.

For example, after a reaction of caprolactone triol, neopentyl glycol and dimethyl cyclohexanedicarboxylate (ester exchange reaction) to obtain a branched polyol, and then the prepolyol may be reacted with adipic acid to obtain the caprolactone-modified hyperbranched polyester polyol having a symmetrical structure.

For example, the polyol obtained by the ester exchange reaction may have the following repeating units.

<Formula 2>

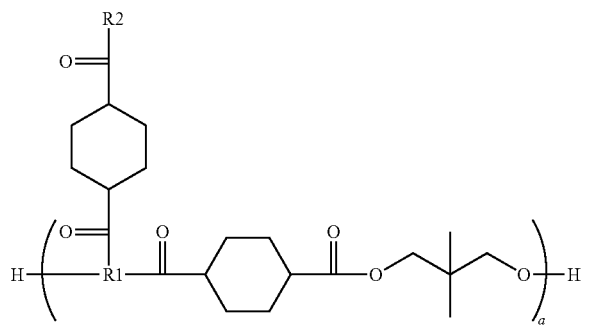

In Formula 2, R1 and R2 are moieties derived from caprolactone triol. R1 is a trivalent group, and R2 has two hydroxyl groups, a represent a natural number. For example, R1 and R2 may be represented by the following Formulas 3 and 4, respectively.

<Formula 3>

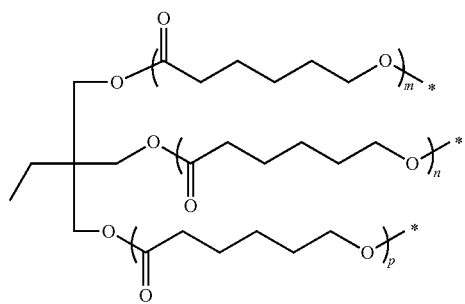

<Formula 4>

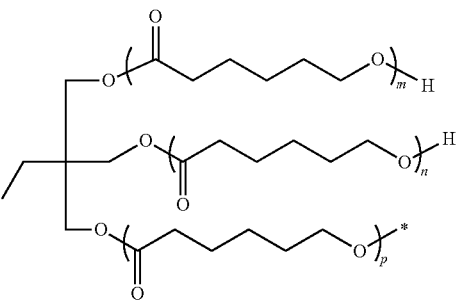

(In Formulas 3 and 4, each of m, n and p is independently a natural number.)

The polyol of Formula 2 may be reacted with an alicyclic polyvalent acid/acid derivative to form the caprolactone-modified hyperbranched polyester polyol having a symmetrical structure. For example, the caprolactone-modified hyperbranched polyester polyol having a symmetrical structure may be represented by the following Formula 5.

<Formula 5>

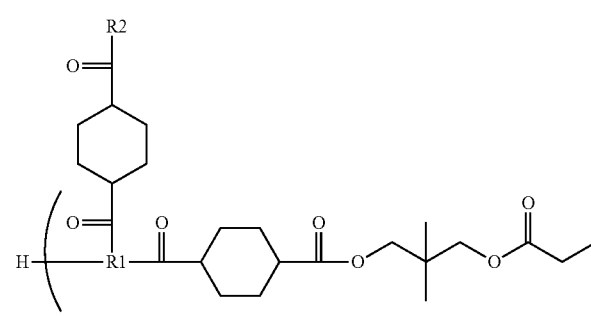

In Formula 5, R1 and R2 are moieties derived from caprolactone triol. R1 is a trivalent group, and R2 has two hydroxyl groups. b represents a natural number.

The caprolactone-modified hyperbranched polyester polyol having such a symmetrical structure has high elasticity of the resin itself, and thus may improve the elasticity and mechanical properties of the coating layer.

In one embodiment, the caprolactone-modified hyperbranched polyester polyol may have an acid value of 10 mg/KOH or less, a hydroxyl group content of 6% to 8%, and a weight average molecular weight of 1,000 to 2,000. The caprolactone-modified hyperbranched polyester polyol has softness properties as a resin in itself and forms a network structure by a cross-linking reaction with a curing agent. Thus, the strength of the coating layer may be enhanced. Also, the caprolactone-modified hyperbranched polyester polyol may increase the impact resistance by having the softness properties.

For example, the content of the caprolactone-modified hyperbranched polyester polyol may be 5 wt % to 20 wt % based on total weight of the coating composition. When the content of the caprolactone-modified hyperbranched polyester polyol is less than 5 wt %, it is difficult to obtain the effect of improving strength, and when the content of the caprolactone-modified hyperbranched polyester polyol is more than 20 wt %, the washing-resistance may be deteriorated. Preferably, the content of the caprolactone-modified hyperbranched polyester polyol may be 5 wt % to 15 wt %.

The coating layer formed using the caprolactone-modified hyperbranched polyester polyol may have excellent strength and high gloss. Also, a polishing operation for gloss may be easily performed, and breakage or damage by external force may be prevented since an impact resistance is excellent. In addition, since the flowability is great during the coating operation, the appearance of the coated object may be improved.

(b) First Acrylic Resin

The first acrylic resin may be obtained by a radical polymerization of monomers a having vinyl-type double bond. The monomers may include various types of monomers, and may include at least a caprolactone-modified (meth)acrylate.

For example, the caprolactone-modified (meth)acrylate may be represented by the following Formula 6.

<Formula 6>

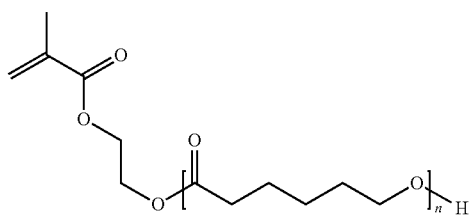

In Formula 6, n represents a natural number. For example, n may be a natural number from 1 to 10.

The softness and strength characteristics of the resin may be controlled according to the number of n, that is, the length of a chain derived from caprolactone. For example, when the chain length is longer, the distance between the crystalline portion (cross-linking region) and non-crystalline portion may increase during the curing reaction, and the elasticity may increase.

The monomer mixture may include, in addition to the caprolactone-modified (meth)acrylate, at least one of aliphatic methacrylate, aliphatic acrylate, methacrylate having a hydroxyl group, (meth)acrylic acid and aromatic acrylate.

The aliphatic methacrylate may include, e.g., butyl methacrylate, methyl methacrylate, ethyl methacrylate, 2-ethylhexyl methacrylate, lauryl methacrylate, isobornyl methacrylate, cyclohexyl methacrylate, etc. The aliphatic acrylate may include, e.g., butyl acrylate, methyl acrylate, ethyl acrylate, 2-ethylhexyl acrylate, etc. The methacrylate having a hydroxyl group may include, e.g., 2-hydroxyethyl methacrylate, 2-hydroxypropyl methacrylate, etc. The aromatic acrylate may include, e.g., styrene monomer. These may be used alone or in combinations of two or more.

In one embodiment, in the monomer mixture, a content of a monomer having a hydroxyl group, that is, the sum of the content of methacrylate having a hydroxyl group and the content of the caprolactone-modified (meth)acrylate may be 20 wt % to 50 wt % based on total weight of the monomer mixture. When the content of the monomer having a hydroxyl group is less than 20 wt %, the cross-linking density may be lowered and the strength may be deteriorated, and when the content of the monomer having a hydroxyl group is more than 50 wt %, the cross-linking density may be excessively increase and the scratch-resistance of the coating layer may be deteriorated, and the storage stability of the coating composition and the compatibility with the solvent may be deteriorated.

More specifically, in one embodiment, the monomer mixture may include aliphatic methacrylate of 20 wt % to 50 wt %, methacrylate having a hydroxyl group of 20 wt % to 50 wt %, (meth)acrylic acid of 0.1 wt % to 3 wt %, aliphatic acrylate of 5 wt % to 20 wt %, caprolactone-modified (meth)acrylate of 10 wt % to 20 wt % and aromatic acrylate of 10 wt % to 20 wt %.

In order to proceed with a polymerization of the monomer mixture, a radical polymerization initiator may be used. The radical polymerization initiator may include, e.g., benzoyl peroxide, tertiary butyl peroxybenzoate, tertiary butyl peroxy-2-ethyl hexanoate, tertiary amyl peroxy-2-ethyl hexanoate, etc. These may be used alone or in combinations of two or more.

The content of the polymerization initiator may be 3 to 10 parts by weight based on 100 parts by weight of the monomer mixture.

The polymerization of the monomer mixture may proceed in an organic solvent. The organic solvent may include, e.g., aromatic hydrocarbons such as toluene, xylene, etc., esters such as N-butyl acetate, ethylene glycol ethyl ether acetate, etc., ketones such as methyl isobutyl ketone, methyl-N-amyl ketone, etc., and the high the reaction temperature, the lower the molecular weight of the resin, so that high boiling point to medium boiling point solvents may be used alone or in combinations of two or more. For example, in consideration of the synthesis temperature and the evaporation rate of the resin, it may be preferable to progress with synthesis at 100° C. to 150° C. using a solvent having a boiling point of 100° C. to 160° C.

In one embodiment, the first acrylic resin may be represented by the following Formula 7.

<Formula 7>

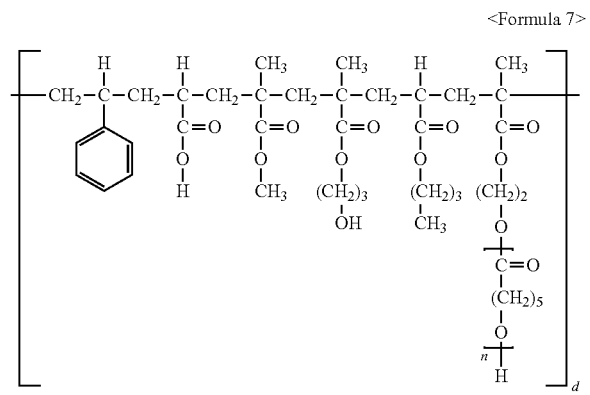

In Formula 7, d is a natural number.

In one embodiment, the first acrylic resin may have a solid content of 60% to 70%, a weight average molecular weight of 5,000 to 12,000, a hydroxyl group content of 4% to 6%, and a glass transition temperature of 10° C. to 20° C.

In one embodiment, the content of the first acrylic resin may be 30 wt % to 50 wt %, and more preferably 35 wt % to 50 wt % based on the total weight of the coating composition. When the content of the first acrylic resin is less than 35 wt %, washing resistance may be lowered, and when the content of the first acrylic resin is more than 50 wt %, acid resistance may be lowered.

The caprolactone-modified (meth)acrylate has softness properties, may prevent scratches of the coating layer, and may provide self-restoration force against scratches.

(c) A Second Acrylic Resin

The second acrylic resin may be obtained by a radical polymerization of monomers having a vinyl-type double bond. The monomers may include various types of monomers, and may not include a caprolactone-modified (meth) acrylate.

The second acrylic resin may include at least one of aliphatic methacrylate, aliphatic acrylate, methacrylate having a hydroxyl group, (meth)acrylic acid and aromatic acrylate.

The aliphatic methacrylate may include, e.g., butyl methacrylate, methyl methacrylate, ethyl methacrylate, 2-ethylhexyl methacrylate, lauryl methacrylate, isobornyl methacrylate, cyclohexyl methacrylate, etc. The aliphatic acrylate may include, e.g., butyl acrylate, methyl acrylate, ethyl acrylate, 2-ethylhexyl acrylate, etc. The methacrylate having a hydroxyl group may include, e.g., 2-hydroxyethyl methacrylate, 2-hydroxypropyl methacrylate, etc. The aromatic acrylate may include, e.g., styrene monomer. These may be used alone or in combinations of two or more.

In one embodiment, in the monomer mixture, the content of methacrylate having a hydroxyl group may be 20 wt % to 40 wt % based on total weight of the monomer mixture. When the content of methacrylate having a hydroxyl group is less than 20 wt %, the cross-linking density may be lowered and the strength may be deteriorated, and when the content of methacrylate having a hydroxyl group is more than 40 wt %, the cross-linking density may be excessively increase and the scratch-resistance of the coating layer may be deteriorated, and the storage stability of the coating composition and the compatibility with the solvent may be deteriorated.

More specifically, in one embodiment, the monomer mixture may include aliphatic methacrylate of 20 wt % to 50 wt %, methacrylate having a hydroxyl group of 20 wt % to 40 wt %, (meth)acrylic acid of 0.1 wt % to 3 wt %, aliphatic acrylate of 5 wt % to 20 wt %, and aromatic acrylate of 10 wt % to 25 wt %.

In order to proceed with a polymerization of the monomer mixture, a radical polymerization initiator may be used and the polymerization of the monomer mixture may proceed in an organic solvent. The initiator, the organic solvent and reaction conditions used in the reaction may be similar to the synthesis of the first acrylic resin.

In one embodiment, the second acrylic resin may have a lower hydroxyl group content and a higher glass transition temperature than the first acrylic resin.

The second acrylic resin may have a solid content of 55% to 65%, a weight average molecular weight of 8,000 to 20,000, a hydroxyl group content of 3% to 5%, and a glass transition temperature of 40° C. to 50° C.

In one embodiment, the content of the second acrylic resin may be 15 wt % to 25 wt % based on the total weight of the coating composition. When the content of the second acrylic resin is less than 15 wt %, washing resistance may be lowered, and when the content of the second acrylic resin is more than 25 wt %, acid resistance may be lowered.

(d) A Solvent

The solvent may control viscosity to enable coating of the composition and improve evenness of a coating layer. The solvent may include, e.g., aromatic hydrocarbons such as toluene, xylene, etc., esters such as N-butyl acetate, ethylene glycol ethyl ether acetate, etc., ketones such as methyl isobutyl ketone, methyl-N-amyl ketone, etc.

For example, the content of the solvent may be 20 wt % to 40 wt %.

(e) Additives

The additives may include, e.g., a wetting agent, a light stabilizer, a reaction catalyst, etc. The wetting agent may improve the wettability and leveling property of the coating layer. For example, a polydimethylsiloxane series may be used as the wetting agent.

The light stabilizer may increase light resistance of the coating layer and may improve weather resistance. The light stabilizer may be an ultraviolet absorber (UVA) or a radical scavenger. For example, Tinuvin 1130 that is an ultraviolet absorber (UNA), or Tinuvin 292 of a hindered amine (HALS) series that is a radical scavenger may be used as the light stabilizer. These may be used alone or in combinations of two or more, and may be preferably used in combinations.

The reaction catalyst may be a urethane reaction catalyst, which may improve the reaction rate of a hydroxyl group with an isocyanate group. The reaction catalyst may be dibutyltin dilaurate, dibutyltin oxide, etc.

For example, the content of the wetting agent may be 0.1 wt % to 1 wt %, and the content of the light stabilizer may be 0.1 wt % to 1.5 wt %. The content of the reaction catalyst may be 0.1 wt % to 1.5 wt %.

(e) A Curing Agent

The curing agent may be added for curing the coating composition, and may be, e.g., a hexamethylene diisocyanate trimer (HDI trimer) having good yellowing resistance and weather resistance.

For example, the curing agent may be included in an amount of 20 to 40 parts by weight based on 100 parts by weight of the coating composition including (a) the caprolactone-modified hyperbranched polyester polyol, (b) the first acrylic resin, (c) the second acrylic resin, and (d) the solvent.

The coating composition may be cured by heat. For example, it may be thermally cured at about 130° C. to 180° C. to form a cured coating layer.

The coating composition may form a coating layer having scratch resistance and high strength. When the coating composition is applied to an exterior coating of an automobile to a coating layer, the coating layer may be restored against scratches caused by washing, external environment, etc. Particularly, it may be more effective in implementing a black color in which scratches are easily visible.

The coating composition may be used for forming a clear layer (a transparent layer) of an automotive exterior coating. For example, the automotive exterior coating may be performed by the following processes.

First, an object to be coated (an iron plate) may be pretreated. The pretreatment may be a degreasing treatment applying an acid. Thereafter, impurities such as acids may be removed by a washing process. Next, electro-deposition coating may be performed. The electro-deposition coating may be performed by immersing the object in an electro-deposition paint (water-soluble) and applying a voltage to electrochemically form a coating layer. The coating layer may be cured by heat. For example, it may be thermally cured at about 130° C. to 180° C., thereby forming a base coating layer (undercoating layer). A middle primer layer may be formed on the base coating film thermally cured, and a color layer (for example, a black color layer) may be formed on the primer layer. The coating composition according to the above embodiment may be coated on the color layer and thermally cured to form a transparent coating layer.

Hereinafter, the effect of the coating composition according to the present invention and the method for forming a coating layer using the same will be described more fully with reference to specific comparative examples, examples and experiments.

Synthesis Example 1—A Caprolactone-Modified Hyperbranched Polyester Polyol 200 parts by weight of dimethylcyclohexanedicarboxylate (Eastman), 450 parts by weight of caprolactone triol CAPA 3031 (Perstorp), 45 parts by weight of neopentyl glycol, 0.1 part by weight of dibutyltin oxide, 1 part by weight of p-toluenesulfonic acid monohydrate was added to a four-necked flask equipped with a stirrer, the temperature was gradually elevated to 170° C., the mixture was aged at 170° C. for 2 hours while removing condensed water and alcohol, the temperature was elevated to 190° C., and maintained until reaching at 90% or more of theoretical dealcoholization amount.

Thereafter, after cooling the mixture to 150° C., 73 parts by weight of adipic acid was added. Thereafter, the mixture was heated to 170° C., held for 2 hours, heated up to 220° C. over 3 hours, and aged for 1 hour. Thereafter, the mixture was refluxed using xylene to remove the condensed water, and when the acid value became 10 or less, the mixture was cooled to 180° C. and vacuum decompression was performed. Thereafter, the mixture was cooled, and 290 parts by weight of butyl acetate was added as a solvent at 120° C. or lower. As a result, a symmetrical hyperbranched polyester polyol having a solid content of 70% and a hydroxyl group content of 6% was obtained.

Synthesis Example 2—A First Acrylic Resin (1)

After adding 196 g of n-butyl acetate as a solvent to a four-necked flask equipped with a stirrer, a gas in the flask was exchanged with nitrogen gas, the flask was stirred and heated to 120° C. and kept constant. After a mixture in which 110 g of butyl acrylate as an aliphatic acrylate, 150 g of butyl methacrylate as an aliphatic methacrylate, 395 g of 2-hydroxypropyl methacrylate as a methacrylate having a hydroxyl group, 10 g of acrylic acid, 137 g of styrene monomer as an aromatic acrylate, 78 g of tert-butyl peroxy-2-ethylhexanoate as an initiator were mixed was added to the solvent at a uniform dropping rate over 5 hours, the mixture was further aged at a reaction temperature of 120° C. for 1 hour after the addition. Thereafter, a solution including 9 g of tert-butyl peroxy-2-ethylhexanoate dissolved in 24 g of n-butyl acetate was added thereto and stirred for 2 hours so that the unreacted monomer was reacted. Thereafter, the mixture was diluted with 169 g of n-butyl acetate to obtain a caprolactone-modified acrylic resin. The caprolactone-modified acrylic resin had a weight average molecular weight of about 5,000 to 12,000, a hydroxyl value of 150 to 170 mgKOH/g (solid content), a solid content of 65%, and a glass transition temperature of 10 to 20° C.

Synthesis Example 3—A Caprolactone-Modified Acrylic Resin (a First Acrylic Resin (2))

Except for using 280 g of 2-hydroxypropyl methacrylate as the methacrylate having a hydroxyl group, and 115 g of Miramer M100 (Miwon) as a caprolactone-modified (meth)acrylate instead of 395 g of 2-hydroxypropyl methacrylate, a caprolactone-modified acrylic resin was obtained in the same manner as in Synthesis Example 2. The caprolactone-modified acrylic resin had a weight average molecular weight of about 5,000 to 12,000, a hydroxyl value of 150 to 170 mgKOH/g (solid content), a solid content of 65%, and a glass transition temperature of 10 to 20° C.

Synthesis Example 4—A Caprolactone-Modified Acrylic Resin (a First Acrylic Resin (3))

Except for using 280 g of 2-hydroxypropyl methacrylate as the methacrylate having a hydroxyl group, and 115 g of FM1 (Daicel) as a caprolactone-modified (meth)acrylate instead of 395 g of 2-hydroxypropyl methacrylate, a caprolactone-modified acrylic resin was obtained in the same manner as in Synthesis Example 2. The caprolactone-modified acrylic resin had a weight average molecular weight of about 5,000 to 12,000, a hydroxyl value of 150 to 170 mgKOH/g (solid content), a solid content of 65%, and a glass transition temperature of 10 to 20° C.

Synthesis Example 5—A Caprolactone-Modified Acrylic Resin (a First Acrylic Resin (4))

Except for using 280 g of 2-hydroxypropyl methacrylate as the methacrylate having a hydroxyl group, and 115 g of FM3 (Daicel) as a caprolactone-modified (meth)acrylate instead of 395 g of 2-hydroxypropyl methacrylate, a caprolactone-modified acrylic resin was obtained in the same manner as in Synthesis Example 2. The caprolactone-modified acrylic resin had a weight average molecular weight of about 5,000 to 12,000, a hydroxyl value of 150 to 170 mgKOH/g (solid content), a solid content of 65%, and a glass transition temperature of 10 to 20° C.

Synthesis Example 6—A Caprolactone-Modified Acrylic Resin (a First Acrylic Resin (5))

Except for using 280 g of 2-hydroxypropyl methacrylate as the methacrylate having a hydroxyl group, and 15 g of FM5 (Daicel) as a caprolactone-modified (meth)acrylate instead of 395 g of 2-hydroxypropyl methacrylate, a caprolactone-modified acrylic resin was obtained in the same manner as in Synthesis Example 2. The caprolactone-modified acrylic resin had a weight average molecular weight of about 5,000 to 12,000, a hydroxyl value of 150 to 170 mgKOH/g (solid content), a solid content of 65%, and a glass transition temperature of 10 to 20° C.

Among the caprolactone-modified (meth)acrylates used in Synthesis Examples 3 to 6, FM1 has the smallest molecular weight and FM5 has the largest molecular weight.

Synthesis Example 7—A Second Acrylic Resin

After adding 240 g of n-butyl acetate as a solvent to a four-necked flask equipped with a stirrer, a gas in the flask was exchanged with nitrogen gas, the flask was stirred and heated to 120° C. and kept constant. After a mixture in which 64 g of butyl acrylate as an aliphatic acrylate, 240 g of butyl methacrylate and 152 g of methyl methacrylate as an aliphatic methacrylate, 176 g of 2-hydroxyethyl methacrylate as a methacrylate having a hydroxyl group, 8 g of methacrylic acid, 160 g of styrene monomer as an aromatic acrylate, 88 g of tert-butyl peroxy-2-ethylhexanoate as an initiator were mixed was added to the solvent at a uniform dropping rate over 5 hours, the mixture was further aged at a reaction temperature of 120° C. for 1 hour. Thereafter, a solution including 4 g of tert-butyl peroxy-2-ethylhexanoate dissolved in 24 g of n-butyl acetate was added thereto and stirred for 2 hours so that the unreacted monomer was reacted. Thereafter, the mixture was diluted with 248 g of n-butyl acetate to obtain a caprolactone-modified acrylic resin. The caprolactone-modified acrylic resin had a weight average molecular weight of about 8,000 to 20,000, a hydroxyl value of 130 to 140 mgKOH/g (solid content), a solid content of 60%, and a glass transition temperature of 40 to 50° C.

Examples/Comparative Examples

According to the composition represented by the following Table 1, the polyol mixture of Comparative Examples 1 to 3 and Examples 1 to 6 was prepared (unit: wt %). A main material composition including each polyol mixture, 1 wt % of dibutyltin dilaurate, 1 wt % of BYK-306 (BYK) as wetting agent, 1.2 wt % of a mixture of TINUVIN 1130 and TINUVIN 292 as light stabilizer and extra solvent (butyl acetate and xylene) was prepared.

In order to evaluate the impact resistance, an impact was applied at a height of 50 cm and a load of 1 kg by using a fall drop tester of ISO 6272, and appearance and initial adhesion were evaluated.

In order to evaluate the acid resistance, 0.2 ml of 0.5% sulfuric acid and 0.1N of prescribed hydrochloric acid were dropped onto a surface of the coating layer, and the coating layer was allowed to stand at room temperature for 24 hours and then washed with water to evaluate appearance changes.

In order to evaluate the chemical resistance, the sample was rubbed back and forth 10 times with a force of 5N using prescribed chemicals, and then left in a thermostatic chamber at about 80 t for 3 hours to evaluate the surface state of the sample.

In order to evaluate the heat resistance, the sample was allowed to stand in a chamber of about 90° C. for 300 hours, and then the appearance and initial adhesion of the sample were evaluated.

In order to evaluate the water resistance, after the sample was immersed in a water bath at about 50° C. for 240 hours, the appearance and initial adhesion of the sample were evaluated.

TABLE 1

|  | Synthesis Example1 | Synthesis Example2 | Synthesis Example3 | Synthesis Example4 | Synthesis Example5 | Synthesis Example6 | Synthesis Example7 |
|---|---|---|---|---|---|---|---|
| Comparative Example 1 | — |  | 60 | — | — | — | 10 |
| Comparative Example 2 | — |  | 40 | — | — | — | 30 |
| Comparative Example 3 | — | 50 | — | — | — | — | 20 |
| Example 1 | — |  | 50 | — | — | — | 20 |
| Example 2 | — |  | — | 50 | — | — | 20 |
| Example 3 | — |  | — | — | 50 | — | 20 |
| Example 4 | — |  | — | — | — | 50 | 20 |
| Example 5 | 10 |  | — | — | — | 40 | 20 |
| Example 6 | 20 |  | — | — | — | 30 | 20 |

33, 28, 34, 30, 29, 28, 27, 29 and 31 parts by weight of curing agent (HI-100, BASF) were mixed with a mixture was mixed) with the main material composition of the Comparative Examples 1 to 3 and Examples 1 to 6, respectively. The water resistance, impact resistance, acid resistance, heat resistance/chemical resistance/weather resistance, washing resistance (ΔL) and pencil strength of a coating film obtained from the mixture were measured/evaluated and are shown in Table 2 below.

In order to evaluate the water resistance, the sample was immersed in a water bath at about 50° C. for 240 hours, and taken out to evaluate appearance and initial adhesion.

In order to evaluate the weather resistance, appearance change was observed after irradiation of 2500 kJ/m$^2$ according to SAE J1960.

In order to evaluate the washing resistance, after initial gloss and initial color difference (L) were measured, the sample was mounted on a test stand and the prescribed Dust solution was continuously sprayed after agitation, and a polystyrene brush was reciprocated 10 times at a moving speed of 5 m/min. Next, the sample was washed with soapy water, left at room temperature, and then foreign substance of a surface of the sample was removed with an organic cleaning agent. Next, the color difference value of the sample was measured to calculate ΔL.

TABLE 2

|  | Water resistance | Impact resistance | Acid resistance | Heat resistance/ Chemical resistance/ Weather resistance | Washing resistance (ΔL) | Pencil strength |
|---|---|---|---|---|---|---|
| Comparative Example 1 | Good | Good | Bad | Good | 2.2 | HB |
| Comparative Example 2 | Good | Bad | Good | Good | 9 | HB |
| Comparative Example 3 | Good | Good | Good | Good | 5.8 | HB |
| Example 1 | Good | Good | Good | Good | 3.5 | HB |
| Example 2 | Good | Good | Good | Good | 2.9 | HB |
| Example 3 | Good | Good | Good | Good | 2.3 | HB |

TABLE 2-continued

| | Water resistance | Impact resistance | Acid resistance | Heat resistance/ Chemical resistance/ Weather resistance | Washing resistance (ΔL) | Pencil strength |
|---|---|---|---|---|---|---|
| Example 4 | Good | Good | Good | Good | 2.3 | HB |
| Example 5 | Good | Good | Good | Good | 2.4 | F |
| Example 6 | Good | Good | Good | Good | 5.5 | F~H |

Referring to Table 2, in the case of Comparative Example 1 using 60% by weight of the caprolactone-modified acrylic resin, it is understood that the washing resistance is excellent while the acid resistance is poor. In the case of Comparative Example 2 using 30 wt % of the acrylic resin of Synthesis Example 7 having a high glass transition temperature, it is understood that the impact resistance and the wettability are deteriorated. In the case of Comparative Example 3 excluding the caprolactone-modified acrylic resin, the washing resistance is poor. Referring to Examples 1 to 4, in the case that caprolactone-modified (meth)acrylate (FM3, FM5) having a relatively large molecular weight (that is, a distance between an acrylate group and a hydroxyl group is long) is used for synthesizing a caprolactone-modified acrylic resin, the washing resistance is further improved. Referring to properties of Examples 5 and 6, in the case that the caprolactone-modified hyperbranched polyester polyol is used, it is possible to obtain an effect of increasing the strength, but when the amount is excessive, for example, 20 wt %, it is understood that the washing resistance is deteriorated.

The above coating composition may be used for coating a product having a metal exterior such as an automobile.

As described above, although the present invention has been described with reference to example embodiments, those skilled in the art will readily appreciate that many modifications are possible in the example embodiments without materially departing from the novel teachings and advantages of the present inventive concept.

What is claimed is:

1. A coating composition for forming a scratch-resistant layer having a high strength for automobile exterior, comprising:
    5 wt % to 20 wt % of a caprolactone-modified hyperbranched polyester polyol, the caprolactone-modified hyperbranched polyester polyol obtained from polyhydric alcohol including caprolactone triol;
    30 wt % to 50 wt % of a first acrylic resin, the first acrylic resin having a hydroxyl group;
    15 wt % to 25 wt % of a second acrylic resin, the second acrylic resin having a hydroxyl group and having a glass transition temperature higher than that of the first acrylic resin; and
    20 wt % to 40 wt % of a solvent,
    wherein the first acrylic resin has a solid content of 60% to 70%, a weight average molecular weight of 5,000 to 12,000, and a glass transition temperature of 10° C. to 20° C.

2. The coating composition for automobile exterior of claim 1, wherein the caprolactone-modified hyperbranched polyester polyol has an acid value of 10 mg/KOH or less, and a weight average molecular weight of 1,000 to 2,000.

3. The coating composition for automobile exterior of claim 2, wherein the caprolactone-modified hyperbranched polyester polyol is obtained by reacting a polybasic acid or a derivative thereof, a diol compound and the caprolactone triol.

4. The coating composition for automobile exterior of claim 3, wherein the polybasic acid or a derivative thereof includes at least one selected from the group consisting of terephthalic acid, phthalic acid, phthalic anhydride, dimethylterephthalic acid, naphthalene dicarboxylate, tetrachlorophthalic acid, terephthalic acid bisglycol ester, isophthalic acid, t-butyl isophthalic acid, fumaric acid, adipic acid, azelaic acid, sebacic acid, dodecanoic acid, glutaric acid, succinic acid, oxalic acid, itaconic acid, dimeric fatty acid, maleic anhydride, succinic acid anhydride, chlorendic acid, diglycolic acid, pimelic acid, suberic acid, 1,4-cyclohexanedicarboxylic acid, 1,3-cyclohexanedicarboxylic acid, hexahydrophthalic anhydride and dimethyl cyclohexanedicarboxylate.

5. The coating composition for automobile exterior of claim 3, wherein the diol compound includes at least one selected from the group consisting of 1,6-hexanediol, 2-butyl-2-ethyl-1,3-propanediol, 1,4-cyclohexanedimethanol, diethylene glycol, 1,3-propanediol, ethylene glycol, propylene glycol, 2,4-dimethyl-2-ethylhexane-1,3-diol, 2-ethyl-2-isobutyl-1,3-propanediol, 1,3-butanediol, 1,4-butanediol, 1,5-pentanediol, 3-methyl-1,5-pentanediol, methylpropanediol, 2-methyl-1,3-propanediol, dipropylene glycol and 1,9-nonanediol.

6. The coating composition for automobile exterior of claim 1, wherein the first acrylic resin is obtained by a radical polymerization of a monomer mixture including aliphatic methacrylate of 20 wt % to 50 wt %, methacrylate having a hydroxyl group of 20 wt % to 50 wt %, (meth)acrylic acid of 0.1 wt % to 3 wt %, aliphatic acrylate of 5 wt % to 20 wt %, caprolactone-modified (meth)acrylate of 10 wt % to 20 wt % and aromatic acrylate of 10 wt % to 20 wt %.

7. The coating composition for automobile exterior of claim 1, wherein the second acrylic resin has a solid content of 55% to 65%, a weight average molecular weight of 8,000 to 20,000, and a glass transition temperature of 40° C. to 50° C.

8. The coating composition for automobile exterior of claim 7, wherein the second acrylic resin is obtained by a radical polymerization of a monomer mixture including aliphatic methacrylate of 20 wt % to 50 wt %, methacrylate having a hydroxyl group of 20 wt % to 40 wt %, (meth)acrylic acid of 0.1 wt % to 3 wt %, aliphatic acrylate of 5 wt % to 20 wt % and aromatic acrylate of 10 wt % to 25 wt %.

9. The coating composition for automobile exterior of claim 1, wherein the solvent includes an alcohol-based solvent.

10. The coating composition for automobile exterior of claim 1, further comprising:
    at least one selected from the group consisting of a wetting agent, a light stabilizer and a reaction catalyst.

11. A method for coating automobile exterior, comprising:
    pretreating a surface of an object to be coated;
    forming a base coating layer on the surface of the object to be coated;
    forming a color layer on the base coating layer;

coating a mixture of the coating composition of claim 1 and a curing agent on the color layer; and heat-treating the coated mixture to form a cured coating layer.

12. The method of claim 11, the curing agent includes a hexamethylene diisocyanate trimer.

\* \* \* \* \*